(12) United States Patent
Hogger

(10) Patent No.: US 10,870,452 B2
(45) Date of Patent: Dec. 22, 2020

(54) FIBER-REINFORCED PLASTIC COMPONENT AND METHOD FOR PRODUCING SAME

(71) Applicant: Bayerische Motoren Werke Aktiengesellschaft, Munich (DE)

(72) Inventor: Thomas Hogger, Otterfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/213,417

(22) Filed: Dec. 7, 2018

(65) Prior Publication Data
US 2019/0106159 A1 Apr. 11, 2019

Related U.S. Application Data

(63) Continuation of application No. PCT/EP2017/061107, filed on May 10, 2017.

(30) Foreign Application Priority Data

Jun. 8, 2016 (DE) .................. 10 2016 210 095

(51) Int. Cl.
| | | |
|---|---|---|
| *B62D 29/04* | (2006.01) | |
| *B29C 65/02* | (2006.01) | |
| *B29C 65/00* | (2006.01) | |
| *B33Y 10/00* | (2015.01) | |
| *B33Y 80/00* | (2015.01) | |
| *B29L 31/00* | (2006.01) | |
| *B29L 31/30* | (2006.01) | |

(52) U.S. Cl.
CPC .............. *B62D 29/04* (2013.01); *B29C 65/02* (2013.01); *B29C 66/526* (2013.01);
(Continued)

(58) Field of Classification Search
CPC .......... Y10T 428/249921; B62D 29/04; B29C 66/721; B29C 66/7392; B29C 66/61;
(Continued)

(56) References Cited

U.S. PATENT DOCUMENTS

2003/0186042 A1* 10/2003 Dunlap .................. B29C 39/24
428/304.4
2008/0072527 A1 3/2008 Kondo et al.
(Continued)

FOREIGN PATENT DOCUMENTS

| CN | 101516613 A | 8/2009 |
|---|---|---|
| CN | 101722663 A | 6/2010 |

(Continued)

OTHER PUBLICATIONS

English translation of Chinese-language Office Action issued in counterpart Chinese Application No. 201780014224.X dated Dec. 3, 2019 (nine (9) pages).

(Continued)

*Primary Examiner* — David Sample
*Assistant Examiner* — Donald M Flores, Jr.
(74) *Attorney, Agent, or Firm* — Crowell & Moring LLP

(57) ABSTRACT

A fiber-reinforced plastic component includes a three-dimensional component plastic member and at least one reinforcement fiber rod. The three-dimensional component plastic member determines at least parts of a shape of the plastic component. The three-dimensional component plastic member has at least one void which is open to at least one side and in which the at least one reinforcement fiber rod is placed.

13 Claims, 1 Drawing Sheet

(52) U.S. Cl.
CPC ............ *B29C 66/532* (2013.01); *B29C 66/61* (2013.01); *B29C 66/71* (2013.01); *B29C 66/721* (2013.01); *B29C 66/7212* (2013.01); *B29C 66/7392* (2013.01); *B29C 66/73921* (2013.01); *B29C 66/91411* (2013.01); *B29C 66/91931* (2013.01); *B33Y 10/00* (2014.12); *B33Y 80/00* (2014.12); *B29L 2031/001* (2013.01); *B29L 2031/30* (2013.01); *Y10T 428/249921* (2015.04)

(58) Field of Classification Search
CPC ... B29C 66/532; B29C 66/71; B29C 66/7212; B29C 66/73921; B29C 66/91411; B29C 66/91931; B29C 66/526; B29C 65/02; B33Y 80/00; B33Y 10/00; B29L 2031/30; B29L 2031/001
USPC ........................................................ 428/221
See application file for complete search history.

(56) References Cited

U.S. PATENT DOCUMENTS

| | | |
|---|---|---|
| 2010/0028616 A1 | 2/2010 | Yamanouchi et al. |
| 2015/0151497 A1 | 6/2015 | Schulz |
| 2015/0321444 A1 | 11/2015 | Breu et al. |
| 2016/0101576 A1 | 4/2016 | Joern |

FOREIGN PATENT DOCUMENTS

| | | | |
|---|---|---|---|
| DE | 10 2005 034 621 B3 | 1/2007 | |
| DE | 10 2013 218 520 A1 | 3/2015 | |
| EP | 1 849 588 A1 | 10/2007 | |
| EP | 2 399 727 A1 | 12/2011 | |
| EP | 2 878 434 A1 | 6/2015 | |
| EP | 2 915 659 A1 | 9/2015 | |
| JP | 4-135720 A | 5/1992 | |
| WO | WO 2014/189946 A1 | 11/2014 | |
| WO | WO-2014189946 A1 * | 11/2014 | ........... B29C 66/929 |

OTHER PUBLICATIONS

International Search Report (PCT/ISA/210) issued in PCT Application No. PCT/EP2017/061107 dated Jul. 24, 2017 with English translation (six (6) pages).

German-language Written Opinion (PCT/ISA/237) issued in PCT Application No. PCT/EP2017/061107 dated Dec. 14, 2017 (five (5) pages).

German-language Office Action issued in counterpart German Application No. 10 2016 210 095.5 dated Oct. 18, 2016 with partial English translation (11 pages).

\* cited by examiner

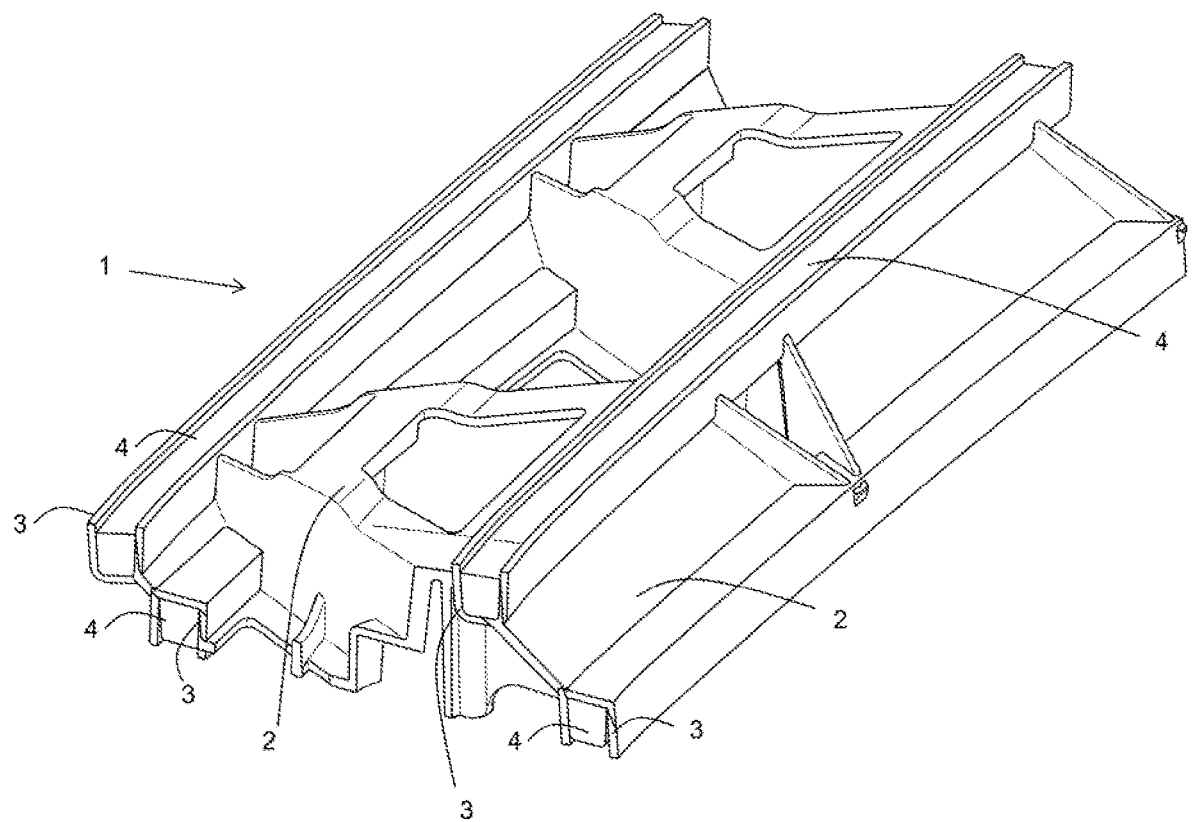

FIBER-REINFORCED PLASTIC COMPONENT AND METHOD FOR PRODUCING SAME

CROSS REFERENCE TO RELATED APPLICATIONS

This application is a continuation of PCT International Application No. PCT/EP2017/061107, filed May 10, 2017, which claims priority under 35 U.S.C. § 119 from German Patent Application No. 10 2016 210 095.5, filed Jun. 8, 2016, the entire disclosures of which are herein expressly incorporated by reference.

BACKGROUND AND SUMMARY OF THE INVENTION

The embodiments of the invention relate to a fiber-reinforced plastic component and to a method for producing said fiber-reinforced plastic component.

Fiber-reinforced plastic components have been used for many years in various fields of technology, inter alia also intensively in the automotive industry. Said fiber-reinforced plastic components have a high potential in lightweight construction and as compared to other materials such as, for example, metals or non-reinforced plastics, can absorb high tensile forces on account of the incorporated fibers. The weight-specific advantages of fiber-reinforced plastics herein can be best utilized when the fibers in the matrix material are laid out so as to be correctly adapted to the load path, this requiring a construction of the material that is correctly adapted to the stress.

Reinforcement fiber rods are used in the technology of fiber-composite components and differ from fiber tiers or woven fiber fabrics in that said reinforcement fiber rods are formed by a multiplicity of fibers that are continuous in one direction, that is to say have been shaped to a predetermined rod shape by the fibers. In most instances round, rectangular, or hexagonal rods having a height-to-width ratio of more than or equal to 1:10 are used herein as a cross-sectional shape of the rod. In the case of lower height-to-width ratios this is not a shaped fiber rod but a type of scrim.

The use in a skeleton construction mode with subsequent processing by injection molding for fabricating components has also proven advantageous for the use of fiber rods, but the investment costs for the tooling for producing components of this type are comparatively high.

The embodiments of the invention are therefore based on the object of providing fiber-reinforced plastic components and a method for producing the latter, in which the positive effect of the reinforcement fiber rods are utilizable in a more cost-effective manner.

This and other objects are achieved by a fiber-reinforced component having a three-dimensional component plastic member which determines at least parts of a shape of the plastic component, and at least one reinforcement fiber rod is proposed. The component plastic member herein has at least one void which is open to at least one side and in which the at least one reinforcement fiber rod is placed.

Carbon fiber rods having a plastics material matrix are in particular used as reinforcement rods. The component plastic member depicts at least one part of the final shape of the fiber-reinforced plastic component to be fabricated.

As a cost-effective embodiment it has proven positive for the component plastic member to be produced in a generative or additive, respectively, manufacturing method. The manufacturing herein is performed directly from shapeless, in most instances liquid or pulverulent, material by means of chemical and/or physical processes based on data models which are stored in the computer. Selective laser sintering in particular is used in order for the three-dimensional shape to be generated. Suitable materials for the component plastic member are, for example, polyamide 6 or polyamide 12.

In one exemplary embodiment it is provided for the fiber-reinforced plastic component that the at least one void is configured by a tub-shaped or groove-shaped depression. Depressions of this type are particularly suitable for placing the reinforcement fiber rods. Moreover, said depressions can be dimensioned so as to correspond to the measurements of the reinforcement fiber rods such that the reinforcement fiber rods fully or substantially fully fill the voids. Alternatively however, it is also possible for the void to be configured so as to be open toward two sides. In this instance, the reinforcement fiber rod placed in the void is held, for example, by way of a tool until the reinforcement rod is fixed to the component plastic member. The reinforcement rod in this instance is accessible from two sides in the finished component.

The component plastic member can solely, or conjointly with further components, form the external shape of the fiber-reinforced plastic component. It is provided according to one variant that the fiber-reinforced plastic component in addition to the component plastic member has at least one mating member which is configured for closing the open side of the at least one void. In a refinement, the mating member, at least in portions in the region of the at least one void, has a shape that is complementary to the component plastic member. The mating member, or the mating members, respectively, and the component plastic member conjointly form the fiber-reinforced plastic component. The reinforcement fiber rods extend in the depressions that are enclosed by the member elements and enhance the rigidity of the plastic component.

An embodiment in which the reinforcement fiber rods are pressed through the mating member into the respective void is likewise favorable. It is in particular provided that the reinforcement fiber rods are connected in a materially integral manner to the component plastic member. This can be implemented, for example, by heating the reinforcement fiber rods or the component plastic member according to the production methods described hereunder.

In order for the fiber-reinforced plastic component to be reinforced across an enlarged area, a multiplicity of voids which extend in each case in a parallel direction are provided in the component plastic member. Herein one reinforcement fiber rod is placed in each of the multiplicity of voids. An advantageous reinforcement, particularly in a predetermined load direction, can be achieved by way of the corresponding configuration. It can moreover be provided for the voids and the fiber rods placed therein to be aligned so as to indeed run in parallel but to be spaced apart in the other two directions. This means that the reinforcement fiber rods within the plastic component in the space run so as to be spaced apart from one another in two planes that are mutually perpendicular. Moreover, the open sides of the voids can point in opposite directions.

In an alternative variant, the fiber-reinforced plastic component is characterized in that a multiplicity of voids which form a framework structure are provided in the component plastic member, and one reinforcement fiber rod is placed in each of the multiplicity of voids. The framework structure by way of reinforcement rods serves for enhancing the rigidity in multiple directions.

Also disclosed herein is a method for producing the aforedescribed fiber-reinforced plastic component, wherein the at least one reinforcement fiber rod is fastened to the component plastic member in that a surface of the component plastic member in the region of the at least one void is heated to a range of the melting temperature of the component plastic member, and the at least one reinforcement fiber rod is placed onto the heated surface such that the at least one fiber rod is welded to the component plastic member.

In a variant of the method it is provided that the at least one reinforcement fiber rod is fastened to the component plastic member in that the at least one reinforcement fiber rod is heated to a melting temperature of the component plastic member, and the at least one heated reinforcement fiber rod is placed into the at least one void of the component plastic member such that the at least one reinforcement fiber rod is welded to the component plastic member.

The materially integral connection between the reinforcement fiber rods in the voids of the component plastic member can be achieved by both methods. The heating of the surface or of the reinforcement fiber rod can be implemented, for example, by way of a laser, of infrared radiation, or by infeeding hot air.

In a variant of the method, at least the process of placing the reinforcement fiber rods is automated, preferably in that the reinforcement fiber rods are placed into the voids and fastened therein in a robotically guided manner. Compressing and/or applying the aforedescribed mating member, for example as a type of lid, can also be performed in a robotically supported manner. The manufacturing time is significantly shortened on account thereof.

BRIEF DESCRIPTION OF THE DRAWING

Other objects, advantages and novel features of the present invention will become apparent from the following detailed description of one or more preferred embodiments when considered in conjunction with the accompanying drawing in which:

FIG. 1 is a perspective illustration of a component plastic member having reinforcement fiber rods for a fiber-reinforced plastic component.

DETAILED DESCRIPTION OF THE DRAWING

A three-dimensional component plastic member 1 of a fiber-reinforced plastic component is illustrated in a perspective view in FIG. 1. The component plastic member 1 thus forms part of the shape of the plastic component.

The component plastic member 1 is produced by the 3D printing method and has a multiplicity of voids that extend in parallel and are configured as a tub-shaped depression 3. The tub-shaped depressions 3 are in each case open to one side, wherein the open side in the width direction in an alternating manner points in a first and a second axial direction. Both the depressions 3 as well as the reinforcement fiber rods 4 placed therein run in parallel in a longitudinal direction, but in spatial terms are spaced apart in an alternating manner both in the width direction as well as in the axial direction.

The component plastic member 1 has a multiplicity of structural elements 2 which connect the depressions 3 and per se form substantial parts of the component plastic member 1. The depressions 3 for reasons of production methodology are configured so as to be integral on the component plastic member 1. One reinforcement fiber rod 4 is placed in each depression 3. The reinforcement fiber rods 4 are penetrated by a plastic matrix. Said reinforcement fiber rods 4 substantially have the cross-sectional shape of the depressions 3 and in spatial terms fill the latter with the exception of a small peripheral spacing of less than 10% of the cross-sectional area of the depression toward the respective open side. This also means that the reinforcement fiber rods 4 extend across the entire length of the depressions 3. The reinforcement rods 4 are fastened in a materially integral manner in the depressions 3 by one of the aforedescribed methods. The illustration of a mating member has been dispensed with in FIG. 1; however, said mating member could be readily added so as to, conjointly with the component plastic member 1, form the fiber-reinforced plastic component. Mating members can also be disposed on both axial sides, the depressions 3 being closed on account thereof.

The embodiments of the invention are not limited to the preferred exemplary embodiments stated above. Rather, a number of variants which make use of the illustrated solution even for embodiments of a fundamentally different nature are conceivable. For example, the reinforcement fiber rods do not have to extend in a linear manner but can run in the component plastic member so as to correspond to curved designs of voids.

The foregoing disclosure has been set forth merely to illustrate the embodiments of the invention and is not intended to be limiting. Since modifications of the disclosed embodiments incorporating the spirit and substance of the invention may occur to persons having ordinary skill in the art, the embodiments of the invention should be construed to include everything within the scope of the appended claims and equivalents thereof.

What is claimed is:

1. A fiber-reinforced plastic component comprising:
   a three-dimensional component plastic member which determines at least parts of a shape of the plastic component; and
   at least one reinforcement fiber rod, wherein
   the three-dimensional component plastic member has at least one void which is open to at least one side and in which the at least one reinforcement fiber rod is placed,
   the at least one void is a plurality of voids which form a framework structure which are provided in the component plastic member, and
   the at least one reinforcement fiber rod is placed in each of the plurality of voids.

2. The fiber-reinforced plastic component as claimed in claim 1, wherein the component plastic member is produced in a generative or additive manufacturing method.

3. The fiber-reinforced plastic component as claimed in claim 2, wherein the plurality of voids are configured by a tub-shaped or groove-shaped depression.

4. The fiber-reinforced plastic component as claimed in claim 1, wherein said fiber-reinforced plastic component in addition to the component plastic member has at least one mating member which is configured for closing the open side of the plurality of voids.

5. The fiber-reinforced plastic component as claimed in claim 4, wherein the at least one mating member, at least in portions in the region of the plurality of voids, has a shape that is complementary to the component plastic member.

6. The fiber-reinforced plastic component as claimed in claim 5, wherein the at least one reinforcement fiber rod is pressed into the plurality of voids via the mating member.

7. The fiber-reinforced plastic component as claimed in claim 6, wherein the at least one reinforcement fiber rod is connected in a materially integral manner to the component plastic member.

8. The fiber-reinforced plastic component as claimed in claim 7, wherein the plurality of voids extend in a parallel direction and are provided in the component plastic member.

9. The fiber-reinforced plastic component as claimed in claim 1, wherein two of the plurality of voids are arranged adjacent to one another and one of said two voids is open to at least another side that is opposite to the at least one side.

10. A fiber-reinforced plastic component comprising:
   a three-dimensional component plastic member which determines at least parts of a shape of the plastic component; and
   at least one reinforcement fiber rod, wherein
      the three-dimensional component plastic member has at least one void which is open to at least one side and in which the at least one reinforcement fiber rod is placed,
      the at least one void has an elongated tub-shape, and
      the at least one void includes two voids arranged adjacent to one another and one of the two voids is open to at least another side that is opposite to the at least one side.

11. A method for producing a fiber-reinforced plastic component, comprising:
   providing a three-dimensional component plastic member which determines at least parts of a shape of the plastic component; and
   providing at least one reinforcement fiber rod, wherein
      the three-dimensional component plastic member has a plurality of voids which are open to at least one side and in which the at least one reinforcement fiber rod is placed,
      the plurality of voids form a framework structure and are provided in the component plastic member, and
      the at least one reinforcement fiber rod is placed in each of the plurality of voids.

12. The method for producing a fiber-reinforced plastic component as claimed in claim 11, wherein the at least one reinforcement fiber rod is fastened to the component plastic member, the at least one reinforcement fiber rod is heated to a melting temperature of the component plastic member, and the at least one heated reinforcement fiber rod is placed into the plurality of voids of the component plastic member such that the at least one reinforcement fiber rod is welded to the component plastic member.

13. The method for producing a fiber-reinforced plastic component as claimed in 12, wherein the at least one reinforcement fiber rod is placed into the plurality of voids in a robotically guided manner.

* * * * *